United States Patent Office 2,826,570
Patented Mar. 11, 1958

2,826,570

POLYETHYLENE COMPOSITION AND PROCESS OF CROSS-LINKING

Reginald W. Ivett, Wilmington, Del., assignor to Hercules Powder Company, Wilmington, Del., a corporation of Delaware No Drawing. Application May 24, 1955
Serial No. 510,835

8 Claims. (Cl. 260—94.9)

This invention relates to an ethylene polymer composition capable of being cross-linked and to a process for cross-linking normally solid polymers of ethylene.

The well-known polymers of ethylene, such as those described in U. S. Patent 2,153,553, are generally characterized by thermoplasticity and solubility in many organic solvents. In recent years, several methods of curing these polymers by cross-linking to convert them to relatively insoluble, less thermoplastic polymers have been proposed. One such method involves electron bombardment of the polymers. Other methods proposed in the art are characterized primarily by the incorporation of a free radical-liberating substance into the solid polymers followed by the application of heat. Many free radical-liberating substances have been proposed for this purpose including organic peroxides and various nitrogen-containing compounds.

While it is known that several organic peroxides when incorporated in a polymer of ethylene can promote cross-linking of the polymer, many of these peroxides have been found disadvantageous in one or more respects. For example, the use of benzoyl peroxide is a definite hazard because at the temperature required for the incorporation of benzoyl peroxide, the benzoyl peroxide may decompose with violence. Other peroxides which have been proposed for the same purpose have been found to promote only a relatively slight amount of cross-linking while still other peroxides are effective only when an undesirably high curing temperature is employed.

It has now been found that certain di(aralkyl) peroxides of the formula

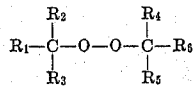

where $R_1$ is aryl, $R_2$, $R_3$, $R_4$ and $R_5$ are hydrogen or alkyl groups of less than 4 carbon atoms and $R_6$ is aryl, are effective agents for promoting the cross-linking of polymers of ethylene. These peroxides can be incorporated in the polymer with a maxium of safety, they promote cross-linking to a high degree, and the temperatures required for cross-linking are moderate.

In accordance with the aforesaid discoveries, the invention provides a composition capable of cross-linking comprising a polymer of ethylene and a minor amount of an organic peroxide of the above formula. The invention further provides a process of cross-linking a polymer of ethylene which comprises incorporating therewith a minor amount of a peroxide of the above formula and heating the resultant mixture.

The following examples illustrate specific embodiments of the invention. All parts and percentages are by weight unless otherwise specified. The quantities of peroxides are on a 100% basis.

EXAMPLE 1

Bis(α,α-dimethylbenzyl) peroxide was incorporated into a commercial polyethylene having a Williams flow height of 55 mils at 130° C. on a two-roll mill at a roll surface temperature of 210° F. Polyethylene granules were fed to the mill as fast as they were fluxed and after all the polymer was fused the peroxide was added as rapidly as uniform blending permitted. Milling was continued for 10 minutes after the first addition of peroxide. The temperature of the mix was measured by a needle pyrometer and maintained below 240° F.

Several compositions containing different amounts of the peroxide were prepared in the above manner. These compositions were then molded in a compression mold having four cavities 0.075 x 6 x 6 inches. In this operation the mold was preheated to 300° F., loaded and closed. After 20 minutes at 300° F. the mold was cooled and the samples removed.

The following table presents flow data on the various compositions and illustrates the degree of cross-linking obtained from varying amounts of peroxide:

Table I.—Flow in inches[1]

| Percent Peroxide | 0 | .05 | 0.10 | 0.25 | 0.50 | 1.0 | 2.0 | 5.0 | 10.0 |
|---|---|---|---|---|---|---|---|---|---|
| At 119° C | 0.97 / 0.90 | 0.83 | 0.70 | 0.54 | 0.33 | 0.22 | 0.10 | 0.06 | 0.04 |
| At 137° C | 1.38 | | | | | 0.21 | | | |
| At 159° C | [2]1.8 / [2]1.7 | [2]1.6 | 1.31 | 0.98 | 0.57 | 0.22 | 0.12 | 0.06 | 0.04 |

[1] These flows were obtained in the Bakelite-Olson flow tester in two minutes at 100 p. s. i (ASTM D569-48).
[2] Estimated. The flow tester stops at 1.5 inches.

The following table presents data on other physical properties of the cross-linked compositions:

Table II.—Physical properties of cross-linked polyethylene

| Percent Peroxide | Tensile Strength, p. s. i. | 100% Modulus, p. s. i. | Maximum Elongation, Percent | Shore B Hardness | Specific Gravity |
|---|---|---|---|---|---|
| 0.0 | 1,310 | 1,240 | 45 to 450 | 76 | |
| 0.0 | 1,200 | 1,190 | 15 to 475 | | 0.922 |
| 0.05 | 1,200 | 1,190 | 35 to 395 | 77 | |
| 0.10 | 1,180 | 1,240 | 30 to 110 | 75 | |
| 0.25 | 1,100 | 1,190 | 40 to 390 | 75 | |
| 0.50 | 1,180 | 1,250 | 45 to 360 | 76 | |
| 1.0 | 1,000 | | 15 to 65 | | 0.921 |
| 2.0 | 1,030 | | 45 to 85 | | 0.919 |
| 5.0 | 1,080 | 1,110 | 70 to 150 | | 0.918 |
| 10.0 | 1,300 | 1,050 | 35 to 265 | | 0.916 |

As can be seen from Table I, the incorporation of the peroxide and subsequent heating effected cross-linking of the polyethylene as evidenced by reduced flow, the reduction in flow being proportional to the amount of peroxide employed. Further evidence that cross-linking had occurred was supplied when the material which had undergone the peroxide treatment was found to be insoluble in hot xylene whereas the original polyethylene was soluble in hot xylene. As seen from Table II, the cross-linking of the polyethylene appears to have had negligible effect on properties such as tensile strength, modulus, hardness and specific gravity. The various compositions also were indistinguishable by sight or touch.

EXAMPLE 2

The cross-linked polyethylene composition prepared in Example 1 that contained 0.1% of bis($\alpha,\alpha$-dimethylbenzyl) peroxide was injection molded into pieces ½ inch wide and 1/16 inch thick. The injection molding was carried out using a one ounce Van Dorn molder with the cylinder at the average temperature indicated in the following table. The overall molding cycle was 30 seconds, the plunger forward time was about 12 seconds. These pieces were folded sharply and forced into nominal 13 mm. test tubes filled with Igepal CA extra (an alkylphenol—ethylene oxide condensation product). The tubes were then kept at 25° C. for 23 hours and then at 50° C. for an additional 180 hours. The data showing the resistance of the various compositions to environmental stress-cracking are as follows:

*Table III.—Stress-cracking of cross-linked polyethylene in Igepal CA extra*

| No. of Pieces | Material | Type of Piece | No. Cracked After— | | | | | | | | Cyl., °F. | Mold, °F. |
|---|---|---|---|---|---|---|---|---|---|---|---|---|
| | | | At 25° C. | | | | | At 50° C. | | | | |
| | | | 10 min. | 45 min. | 2 hrs. | 4 hrs. | 23 hrs. | 2 hrs. | 4 hrs. | 180 hrs. | | |
| 4 | Untreated | Sl Flash | 2 | 2 | 3 | 4 | | | | | 445 | 90 |
| 3 | ...do... | ...do... | 0 | 0 | 1 | 2 | 2 | 3 | | | 445 | 105 |
| 3 | ...do... | Normal | 1 | 1 | 1 | 2 | 2 | 2 | 2 | 2 | 385 | 105 |
| 3 | ...do... | Short | 0 | 1 | 1 | 1 | 1 | 2 | 2 | 3 | 370 | 105 |
| 3 | Cross-linked | Normal | 0 | 0 | 0 | 0 | ¹1 | ¹1 | ¹1 | ¹1 | 475 | 100 |
| 3 | ...do... | Short | 0 | 0 | 0 | 0 | 0 | 0 | 0 | 0 | 445 | 100 |

¹ This crack was nontypical in appearance and is believed to have originated at a surface defect in the piece.

As shown in the above table, 12 out of 13 bars of the ordinary polyethylene cracked, most of them early in the experiment. By contrast, only one out of 6 cross-linked samples cracked and this appeared attributable to a molding defect.

EXAMPLES 3 AND 4

The procedure of Example 1 was followed by milling together 990 parts of polyethylene having a melt index of 2.1 decigrams per minute and, in separate experiments, 10 parts of bis($\alpha,\alpha$-dimethyl-p-isopropylbenzyl) peroxide and 10 parts of bis($\alpha,\alpha$-dimethyl-p-methylbenzyl) peroxide. The resulting compositions were compression molded as in Example 1 and Bakelite-Olson flow values were determined at 151° C. for 80 seconds at 100 p. s. i. Results were as follows.

| Composition Containing | Flow in Inches | |
|---|---|---|
| | Before Molding | After Molding |
| Bis($\alpha,\alpha$-dimethyl-p-isopropylbenzyl) peroxide | 1.36 | 0.27 |
| Bis($\alpha,\alpha$-dimethyl-p-methylbenzyl) peroxide | 1.33 | 0.33 |

The peroxides of this invention are di(aralkyl) peroxides having the structure formula

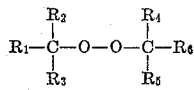

where $R_1$ is an aryl group, $R_2$, $R_3$, $R_4$ and $R_5$ are hydrogen or alkyl groups of less than 4 carbon atoms, and $R_6$ is an aryl group. $R_2$, $R_3$, $R_4$ and $R_5$ may all be the same or each may be a different group or any two or more may be the same or different. Similarly, $R_1$ and $R_6$ may be the same or different aryl groups.

The aryl groups referred to in the above formula may, for example, be phenyl, naphthyl, anthryl, phenanthryl and the like. The aryl groups may contain alkyl substituents as in the case of methylphenyl, ethylphenyl, propylphenyl, isopropylphenyl, butylphenyl, isobutylphenyl, t-butylphenyl, pentamethylethylphenyl, dimethylphenyl, methylethylphenyl, etc., and corresponding alkyl derivatives of the other aryl groups mentioned. The term "aryl" as used herein includes alkaryl groups. When an alkyl substitutent in an aryl group contains less than 4 carbon atoms, it may be the same as or different from any of $R_2$, $R_3$, $R_4$, or $R_5$. Aryl groups in which the alkyl substituents, if any, contain less than 8 carbon atoms are preferred.

The class of di(aralkyl) peroxides of this invention includes the following symmetrical or bis(aralkyl peroxides dibenzyl peroxide, bis($\alpha$-methylbenzyl) peroxide, bis-($\alpha$-ethylbenzyl) peroxide, bis($\alpha$-propylbenzyl) peroxide, bis($\alpha$-isopropylbenzyl) peroxide, bis($\alpha,\alpha$-dimethylbenzyl) peroxide, bis($\alpha$-methyl-$\alpha$-ethylbenzyl) peroxide, bis($\alpha,\alpha$-diethylbenzyl) peroxide, bis($\alpha,\alpha$-dipropylbenzyl) peroxide, bis($\alpha,\alpha$-diisopropylbenzyl) peroxide, bis($\alpha,\alpha$-diisopropylnaphthylmethyl) peroxide, bis($\alpha,\alpha$-dimethylnaphthylmethyl) peroxide, bis($\alpha,\alpha$-dimethyl-p-methylbenzyl) peroxide, bis($\alpha$-methyl-$\alpha$-ethyl-p-methylbenzyl) peroxide, bis-($\alpha,\alpha$-diethyl-p-methylbenzyl) peroxide, bis($\alpha,\alpha$-diisopropyl-p-methylbenzyl) peroxide, bis($\alpha,\alpha$-dimethyl-p-ethylbenzyl) peroxide, bis($\alpha$-methyl-$\alpha$-ethyl-p-ethylbenzyl) peroxide, bis($\alpha,\alpha$-diethyl-p-ethylbenzyl) peroxide, bis($\alpha,\alpha$-diisopropyl-p-ethylbenzyl) peroxide, bis($\alpha,\alpha$-dimethyl-p-isopropylbenzyl) peroxide, bis($\alpha$-methyl-$\alpha$-ethyl-p-isopropylbenzyl) peroxide, bis($\alpha,\alpha$-diethyl-p-isopropylbenzyl) peroxide, bis($\alpha,\alpha$-diisopropyl-p-isopropylbenzyl) peroxide, bis($\alpha,\alpha$-dimethyl-p-t-butylbenzyl) peroxide, bis($\alpha$-methyl-$\alpha$-ethyl-p-t-butylbenzyl) peroxide, bis($\alpha,\alpha$-diethyl-p-t-butylbenzyl) peroxide, bis($\alpha,\alpha$-diisopropyl-p-t-butylbenzyl) peroxide, bis($\alpha,\alpha$-dimethyl-p-pentamethylethylbenzyl) peroxide, bis($\alpha$-methyl-$\alpha$-ethyl-p-pentamethylethylbenzyl) peroxide, bis($\alpha,\alpha$-diethyl-p-pentamethylethylbenzyl) peroxide and bis($\alpha,\alpha$-diisopropyl-p-pentamethylethylbenzyl) peroxide.

Unsymmetrical peroxides of this invention containing two aryl groups include the following compounds: benzyl-($\alpha$-methylbenzyl) peroxide, benzyl($\alpha$-methyl-p-methylbenzyl) peroxide, benzyl($\alpha$-methyl-p-isopropylbenzyl) peroxide, benzyl($\alpha,\alpha$-dimethylbenzyl) peroxide, benzyl-($\alpha,\alpha$-dimethyl-p-methylbenzyl) peroxide, benzyl($\alpha,\alpha$-dimethyl-p-isopropylbenzyl) peroxide, $\alpha$-methylbenzyl($\alpha,\alpha$-dimethylbenzyl) peroxide, $\alpha$-methylbenzyl($\alpha,\alpha$-dimethyl-p-methylbenzyl) peroxide, $\alpha$-methylbenzyl($\alpha,\alpha$-dimethyl-p-isopropylbenzyl) peroxide, $\alpha$-isopropylbenzyl($\alpha,\alpha$-diisopropylbenzyl) peroxide, $\alpha,\alpha$-dimethylbenzyl($\alpha,\alpha$-dimethyl-p-methylbenzyl) peroxide, $\alpha,\alpha$-diisopropylbenzyl($\alpha,\alpha$-diisopropyl-p-methylbenzyl) peroxide and $\alpha,\alpha$-diisopropylbenzyl($\alpha,\alpha$-diisopropyl-p-isopropylbenzyl) peroxide.

In general, the peroxides of this invention are characterized by containing at least fourteen carbon atoms and usually not more than about forty carbon atoms. Di-(aralkyl) peroxides containing fourteen to about twenty-five carbon atoms are preferred as producing a high degree of cross-linking and because they may be prepared from readily available materials. The symmetrical peroxides of this invention are exceptionally useful since in addition to producing good results they can be prepared in higher yields more easily than the unsymmetrical peroxides. Specific peroxides preferred in this invention are bis(α,α-dimethylbenzyl) peroxide, bis (α,α-dimethyl - p-methylbenzyl) peroxide and bis(α,α-dimethyl-p-isopropylbenzyl) peroxide.

The di(aralkyl) peroxides of this invention decompose at a moderate rate under cross-linking conditions to form aralkoxy free radicals. Thus, bis(α,α-dimethylbenzyl) peroxide decomposes to form two α,α-dimethylbenzyloxy free radicals and an unsymmetrical peroxide such as α,α-dimethylbenzyl(α,α-dimethyl - p - methylbenzyl) peroxide decomposes to produce an α,α-dimethylbenzyloxy free radical and an α,α-dimethyl-p-methylbenzyloxy free radical. The other di(aralkyl) peroxides mentioned above decompose to produce the corresponding free radicals. The decomposition of these peroxides is almost entirely dependent upon temperature and almost entirely independent of acidity and alkalinity. A particularly advantageous characteristic of these peroxides is their stability during compounding and their reactivity during subsequent cross-linking.

The peroxides of this invention, both the symmetrical and unsymmetrical peroxides, can be prepared by methods known to the art. A particularly convenient method involves condensation of the corresponding hydroperoxides of the general formula

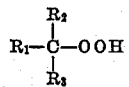

and alcohols having the general formula

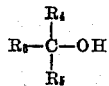

where $R_1$, $R_2$, $R_3$, $R_4$, $R_5$ and $R_6$ are the same as in the general formula for the perovides of this invention. The amount of alcohol utilized should be at least the theoretical calculated amount to combine with all the hydroperoxide and preferably slightly in excess of this amount. The condensation of the hydroperoxide with the alcohol is carried out in the presence of a catalytic amount up to 0.5% of an acid-acting condensation catalyst based on the weight of the alcohol, and the temperature used is between 50° and 120° C. p-Toluene sulfonic acid may be utilized as the acid-acting condensation catalyst. The hydroperoxides and alcohols mentioned above may be prepared in accordance with processes well known to the art.

The polymers of ethylene which are treated in accordance with the invention are materials well known in the art which can be made by polymerizing ethylene by any of several methods. Normally, these polymers are solid, thermoplastic materials that are characterized by toughness and flexibility.

The preparation of the composition of the invention is prepared by blending a polymer of ethylene with a peroxide of the type hereinabove defined. This blending may be accomplished by any of several known manipulative techniques, a preferred method comprising milling granules of the ethylene polymer on hot rolls at about 100–125° C. until the granules have fused and then adding the peroxide directly to the fused polymer with continued milling until a uniform blend results.

The concentrations of peroxide to be incorporated in the ethylene polymer will in general vary between about 0.1% and 10% by weight of the polymer, the optimum concentration depending on the activity of the peroxide selected, the time and temperature to be used in cross-linking, and the degree of cross-linking desired.

Other additives may be incorporated into the ethylene polymer together with the peroxides, provided the nature of these additives does not interfere with or inhibit the cross-linking action of the peroxides. Examples of other additives are heat and light stabilizers; fillers; lubricants; pigments and dyes; other cross-linking agents; antistatic agents; and other resins and elastomers.

Shaping and cross-linking of the polyethylene composition can proceed simultaneously with the incorporation of peroxide but more often will follow the incorporation. Since the compositions of the invention are characterized generally by rapid cross-linking to a high degree at temperatures not much above the temperatures at which the ethylene polymer can be shaped, it is preferred that shaping and cross-linking be carried out simultaneously as, for instance, by compression molding. A temperature from about 130 to about 180° C. is recommended to promote cross-linking.

The invention is not restricted, however, to simultaneous shaping and cross-linking because it is also possible to perform these two operations sequentially, particularly when the concentration of peroxide is low, i. e., less than about 1% by weight. For instance, the examples have shown that an ethylene polymer cross-linked with 0.1% bis(α,α-dimethylbenzyl) peroxide can be shaped by injection molding. Similarly, a composition containing the peroxide, preferably in relatively low concentration, can be shaped by extrusion and then cross-linked by heating at a higher temperature.

What I claim and desire to protect by Letters Patent is:

1. A composition comprising a polymer of ethylene and a minor amount, between about 0.1% and 10% by weight of said polymer, of a di(aralkyl) peroxide of the formula

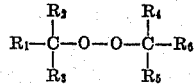

where $R_1$ and $R_6$ are aryl, and $R_2$, $R_3$, $R_4$ and $R_5$ are selected from the group consisting of hydrogen and alkyl radicals of less than 4 carbon atoms.

2. The composition of claim 1 in which the peroxide is bis(α,α-dimethylbenzyl) peroxide.

3. The composition of claim 1 in which the peroxide is bis(α,α-dimethyl-p-isopropylbenzyl) peroxide.

4. The composition of claim 1 in which the peroxide is bis(α,α-dimethyl-p-methylbenzyl) peroxide.

5. The process which comprises incorporating a di(aralkyl) peroxide having the formula

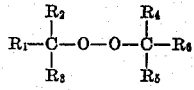

where $R_1$ and $R_6$ are aryl, and $R_2$, $R_3$, $R_4$ and $R_5$ are selected from the group consisting of hydrogen and alkyl groups of less than 4 carbon atoms, into a polymer of ethylene, and heating to effect cross-linking of said polymer, the amount of said peroxide being between about 0.1% and 10% by weight of said polymer.

6. The process of claim 5 in which the peroxide is bis(α,α-dimethylbenzyl) peroxide.

7. The process of claim 5 in which the peroxide is bis(α,α-dimethyl-p-isopropylbenzyl) peroxide.

8. The process of claim 5 in which the peroxide is bis(α,α-dimethyl-p-methylbenzyl) peroxide.

References Cited in the file of this patent
UNITED STATES PATENTS

| | | |
|---|---|---|
| 2,528,523 | Kent | Nov. 7, 1950 |
| 2,628,214 | Pinkney | Feb. 10, 1953 |

Notice of Adverse Decision in Interference

In Interference No. 89,800 involving Patent No. 2,826,570, R. W. Ivett, Polyethylene composition and process of cross-linking, final judgment adverse to the patentee was rendered June 28, 1962, as to claims 1, 2, 5 and 6.

[*Official Gazette October 16, 1962.*]